A. BARTON.

SHOE TOE HEATER.

APPLICATION FILED FEB. 5, 1916.

Reissued July 31, 1917. 14,334.

WITNESSES:

INVENTOR:

Alfred Barton by Geo. H. Boundy & Clay

Attys

UNITED STATES PATENT OFFICE.

ALFRED BARTON, OF MARLBORO, MASSACHUSETTS, ASSIGNOR TO BECKWITH BOX TOE COMPANY, OF DOVER, NEW HAMPSHIRE, A CORPORATION OF MAINE.

SHOE-TOE HEATER.

14,334. Specification of Reissued Letters Patent. Reissued July 31, 1917.

Original No. 1,155,196, dated September 28, 1915, Serial No. 39,208, filed July 10, 1915. Application for reissue filed February 5, 1916. Serial No. 76,487.

*To all whom it may concern:*

Be it known that I, ALFRED BARTON, a citizen of the United States, residing at Marlboro, in the county of Middlesex and Commonwealth of Massachusetts, have invented certain new and useful Improvements in Shoe-Toe Heaters, of which the following is a specification.

The general purpose of the invention is to heat box toes to soften the box for different operations during manufacture.

The particular purpose of the invention is to provide a heater which utilizes steam and supplies heat and moisture suitably regulated, to properly heat and soften the toes in an expeditious way and without burning.

Other objects and advantages of the invention will be sufficiently understood by persons skilled in the art from the following detailed description of the accompanying drawing which shows one exemplifying embodiment of the invention. This embodiment is the best that I have up to the present time devised, but it is to be understood that the invention can be embodied in other forms, and I do not limit myself to details except as claimed hereafter.

Figure 2:
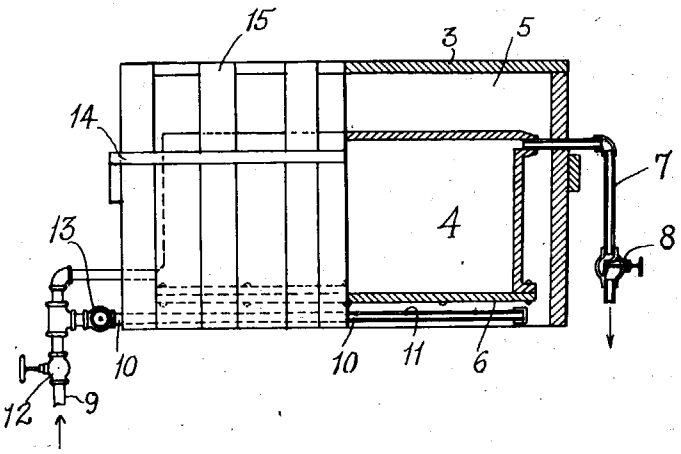
Fig. 2 is a side view, partly in section and partly in elevation.
Figure 1:
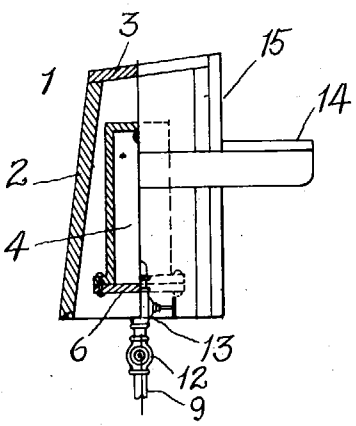
Figure 1 is an end view, partly in section and partly in elevation.

Reference character 1 designates a housing which, for reasons of steam and heat economy, is usually made with a sloping back wall 2, and a sloping top 3. This provides within the housing sufficient space for the steam chest and for the shoe toes without any waste space which would require unnecessary expenditure of heat.

Within the housing is a steam chest 4, which conforms somewhat to the shape of the housing. The shape of the chest may, of course, vary considerably. It is arranged so as to leave a space 5 below the top 3. A convenient construction of the chest includes a removable bottom plate 6. A discharge pipe 7 is connected to the chest at one end near the top, and this pipe is provided with a valve 8. The supply pipe 9 for steam is connected to the chest at the opposite end and near the bottom. Branch 10 from this pipe extends beneath the steam chest, usually running along the whole length thereof, and is provided at the top with a plurality of steam vents 11, of suitable size and arrangement. The valve 12 controls the supply of steam to the chest, and another valve 13 controls the supply of steam to pipe 10.

At the front of the housing is a suitably supported shelf 14 to receive and support the partially formed shoes, and the otherwise open front of the space 5 is suitably divided into shoe-toe-receiving compartments by vertical slats 15.

In operation the support valve 12 is usually wide open; the discharge valve 8 is nearly closed (more or less), and the valve 13 leading to the steam spray pipe 10 is nearly closed (more or less). The valve 13 is adjusted to control the supply of condensed steam into the housing and thus regulate the humidity of the atmosphere in the housing; and the valve 8 is adjusted to secure the desired pressure of steam within the chest and thus control the degree of heat. The atmosphere within the housing, or air passing up through the open bottom of the housing, is heated by the steam chest and moistened by condensed steam from the pipe 10, and suitably moistened heat is thus applied to the shoe toes, which are placed so that they project say about one inch and one-half into the space 5.

It will be noted that, when a partially formed shoe is placed on the shelf or support 14 with its toe end projecting into the housing through one of the openings or apertures in the front wall above the shelf, the box forming a part thereof will be above but in fairly close proximity to the steam chest or heating element 4, so that heat radiating from said chest tends to soften the toe box. It is found in operation that this appliance heats shoe toes of the class described quickly and satisfactorily without burning or other undesirable results.

I claim:—

1. A heater for the purpose mentioned, comprising a housing having an open bottom, rear and top walls and upper front openings for shoe toes with a support adjacent thereto, a steam chest within the housing, a steam supply pipe leading to the chest, a valve therein, a discharge pipe leading from the chest, an apertured steam spray pipe leading from the supply pipe and located beneath the chest, and a valve for controlling the supply of steam to the spray pipe.

2. A heater for the purpose mentioned, comprising a housing having an open bottom, inclined rear and top walls and upper front openings for shoe toes with a support adjacent thereto, a steam chest within the housing, a steam supply pipe leading to the chest, a valve therein, a discharge pipe leading from the chest, a steam spray pipe beneath the chest provided with steam apertures, and a valve controlling the supply of steam to said spray pipe from the main steam pipe.

3. A heater for the purpose mentioned, comprising a housing having an open bottom, inclined rear and top walls and upper front openings for shoe toes with a support adjacent thereto, a steam chest within the housing, a steam supply pipe leading to the chest, a valve therein, a discharge pipe leading from the chest, a valve therein, a steam spray pipe beneath the chest provided with apertures, and a valve controlling the supply of steam to said spray pipe from the main steam pipe.

4. A heater for the purpose mentioned, comprising a housing having an aperture to receive the partially formed shoe, a heating element located within the housing for supplying the desired degree of dry heat but no moisture, and means independent of the heating element and located within said housing for supplying vapor to the atmosphere in the housing.

5. A heater for the purpose mentioned, comprising a housing having means for supporting a partially formed shoe with an end projecting into the housing, means for supplying vapor to moisten the atmosphere in the housing, and a heating element located in the housing independent of the moistening means for supplying dry heat but no moisture to the interior of the housing.

6. A heater for the purpose mentioned, comprising a housing having means for supporting a partially formed shoe with an end projecting into the housing, means for supplying vapor to moisten the atmosphere in the housing, a heating element located in the housing independent of the moistening means for supplying dry heat but no moisture to the interior of the housing, and means for regulating the temperature of the heating element.

7. A heater for softening end parts of partially formed shoes, comprising a housing, means for supplying vaporized moisture to the atmosphere in the housing, a steam chest located within the housing for heating the interior of the housing independently of the moisture-supplying means, and means for supporting a partially formed shoe with an end inserted in said housing in proximity to said steam chest.

8. A heater for softening end parts of partially formed shoes, comprising a housing having an aperture, a support for supporting a partially formed shoe with an end inserted in the housing, a closed steam chest located in the housing to supply heat to the end of such shoe, and means in the housing independent of the steam chest for supplying vapor to the atmosphere in the housing.

9. A heater for softening the end parts of partially formed shoes, comprising a housing having an aperture, a support for supporting a partially formed shoe with an end inserted in the housing, a closed steam chest located in the housing to supply heat to the end of such shoe, a valve-controlled supply pipe for supplying steam to said steam chest, and a valve-controlled pipe for supplying condensed steam to the interior of said housing.

10. A heater for softening the boxes of partially formed shoes, comprising an apertured housing, a support for supporting a partially formed shoe with its toe end inserted in the aperture in the housing, an element for supplying heat but no moisture to the interior of the housing, said heating element being located in proximity to said aperture to heat said shoe by radiation, and means below said element for supplying vapor to the atmosphere in the housing.

11. A heater for softening the toe boxes of shoes, comprising a housing, means for supplying heated moisture to the interior of said housing, a heater separate from said moisture supplying means for supplying heat, but no moisture, and located within said housing, and means for supporting a partially formed shoe with its box exposed to the action of the heat and moisture.

In testimony whereof I have affixed my signature.

ALFRED BARTON.